US008158722B2

(12) United States Patent
Knoll et al.

(10) Patent No.: US 8,158,722 B2
(45) Date of Patent: Apr. 17, 2012

(54) TOUGH AND RIGID MIXTURES OF ALPHA-METHYLSTYRENE-ACRYLNITRILE COPOLYMERS AND OF BLOCK COPOLYMERS

(75) Inventors: Konrad Knoll, Mannheim (DE); Koch Jürgen, Neuhofen (DE); Piyada Charoensirisomboon, Mannheim (DE)

(73) Assignee: Styrolution GmbH, Ludwigshafen (DE)

( * ) Notice: Subject to any disclaimer, the term of this patent is extended or adjusted under 35 U.S.C. 154(b) by 40 days.

(21) Appl. No.: 12/921,043

(22) PCT Filed: Mar. 4, 2009

(86) PCT No.: PCT/EP2009/052536
§ 371 (c)(1),
(2), (4) Date: Sep. 3, 2010

(87) PCT Pub. No.: WO2009/109593
PCT Pub. Date: Sep. 11, 2009

(65) Prior Publication Data
US 2011/0020575 A1    Jan. 27, 2011

(30) Foreign Application Priority Data
Mar. 5, 2008 (EP) .................................... 08152287

(51) Int. Cl.
*B32B 1/08* (2006.01)
*C08L 53/02* (2006.01)
(52) U.S. Cl. .......................................... 525/89; 521/139
(58) Field of Classification Search .................... 525/89; 521/139; 428/36.9
See application file for complete search history.

(56) References Cited

U.S. PATENT DOCUMENTS

| 5,677,387 | A | * | 10/1997 | Bayard et al. |
| 5,760,134 | A | * | 6/1998 | Guntherberg et al. |
| 5,886,112 | A | * | 3/1999 | Vuillemin et al. |
| 6,031,053 | A | * | 2/2000 | Knoll et al. |
| 6,521,712 | B1 | * | 2/2003 | Knoll et al. |
| 6,894,113 | B2 | * | 5/2005 | Court et al. |

FOREIGN PATENT DOCUMENTS

| DE | 4240445 | * | 6/1994 |
| DE | 4420952 | * | 12/1995 |
| EP | 0524054 | * | 1/1993 |
| EP | 0749987 | * | 12/1996 |
| EP | 0767213 | * | 4/1997 |
| EP | 1290086 | * | 3/2003 |
| WO | WO-94/12572 | * | 6/1994 |
| WO | WO-97/40079 | * | 10/1997 |
| WO | WO-00/58680 A1 | * | 10/2000 |
| WO | WO-01/92415 | * | 12/2001 |
| WO | WO-02/066556 | * | 6/2002 |

OTHER PUBLICATIONS

English-language translation of the International Preliminary Report on Patentability (IPRP) in English of International application PCT/EP2009/052536, mailed Sep. 5, 2010.
Riess, et al., "New Morphologies in Rubber-Modified Polymers" XP-002096651, J. Macromol. Sci.-Phys., B17(2), 335-374 (1980).

* cited by examiner

*Primary Examiner* — Jeffrey Mullis
(74) *Attorney, Agent, or Firm* — Connolly Bove Lodge & Hutz LLP

(57) ABSTRACT

Composition comprising at least one copolymer A composed of at least one alkylated styrene, of acrylonitrile, and, if appropriate, of at least one further monomer, at least one block copolymer B which has at least one block forming a hard phase and composed of at least one vinylaromatic monomer and has at least one block forming a soft phase and composed of at least one vinylaromatic monomer and of at least one diene, and at least one further copolymer C, and, if appropriate, one polymer D, where the copolymer C is at least one triblock copolymer composed of a first block composed of at least one vinylaromatic monomer, of a second block composed of at least one diene, and of a third block composed of at least one methyl methacrylate monomer, or comprising at least 50% by weight of methyl methacrylate, and the polymer D is at least one styrene polymer selected from glass-clear and impact-resistant polystyrene. The present invention moreover relates to a process for the preparation of the inventive compositions, to the use of the inventive compositions for the production of moldings, of foils, of fibers, or of foams, to moldings, foils, fibers, or foams comprising the inventive composition, and also to the use of the inventive composition as packaging for electronic components, such as integrated circuits (microchips) ("electronic packing"), for applications in chemical engineering, in household products, in bathroom items, e.g. toothbrush tumblers, cosmetics holders, etc., as housings, as tubes, as profiles, for medical items or medical devices, and in toys.

14 Claims, No Drawings

TOUGH AND RIGID MIXTURES OF ALPHA-METHYLSTYRENE-ACRYLNITRILE COPOLYMERS AND OF BLOCK COPOLYMERS

CROSS REFERENCE TO RELATED APPLICATIONS

This application is a national stage application under 35 U.S.C. §371 of PCT/EP2009/052536, filed Mar. 4, 2009, which claims benefit to European application 08152287.2, filed Mar. 5, 2008, the entire disclosures of which are hereby incorporated by reference.

The present invention relates to a composition comprising at least one copolymer A composed of at least one alkylated styrene, of acrylonitrile, and, if appropriate, of at least one further monomer, at least one block copolymer B which has at least one block forming a hard phase and composed of at least one vinylaromatic monomer and has at least one block forming a soft phase and composed of at least one vinylaromatic monomer and of at least one diene, and at least one further copolymer C, and, if appropriate, one polymer D, where the copolymer C is at least one triblock copolymer composed of a first block composed of at least one vinylaromatic monomer, of a second block composed of at least one diene, and of a third block composed of at least one methyl methacrylate monomer, or comprising at least 50% by weight of methyl methacrylate, and the polymer D is at least one styrene polymer selected from glass-clear and impact-resistant polystyrene. The present invention moreover relates to a process for the preparation of the inventive compositions, to the use of the inventive compositions for the production of moldings, of foils, of fibers, or of foams, to moldings, foils, fibers, or foams comprising the inventive composition, and also to the use of the inventive composition as packaging for electronic components, such as integrated circuits (microchips) ("electronic packing"), for applications in chemical engineering, in household products, in bathroom items, e.g. toothbrush tumblers, cosmetics holders, etc., as housings, as tubes, as profiles, for medical items or medical devices, and in toys.

Thermoplastic compositions are used in a very wide variety of applications. As a function of the application here, various properties of the thermoplastic compositions are significant. In the sector known as "electronic packing" or "electronic packaging", housings are provided for electronic components. These housings are used by way of example in telecommunications, metrology, or traffic engineering. Rigid PVC is the usual thermoplastic material used in the "electronic packaging" sector. PVC in principle has good suitability, but many companies are searching for chlorine-free solutions.

It is an object of the present invention to replace rigid PVC in the "electronic packing" sector by other suitable chlorine-free thermoplastic compositions based on α-methyl-styrene-acrylonitrile copolymers (AMSAN).

AMSAN copolymers and thermoplastic molding compositions comprising these copolymers are known to the person skilled in the art.

By way of example, EP-A 0 767 213 relates to thermoplastic molding compositions composed of a graft copolymer composed of an elastomeric graft core and of a graft shell composed of a styrene compound and/or of an acrylate or methacrylate, and of one or more further monomers (component A), of a thermoplastic polymer composed of styrene and/or α-methylstyrene and, if appropriate, acrylonitrile, and also, if appropriate, of one or more further monomers (component B), of an elastomeric block copolymer composed of at least one block A having copolymerized units of a vinylaromatic monomer and forming a hard phase, and/or of a block B having diene monomers and forming a first elastomeric (soft) phase, and of at least one elastomeric block B/A having copolymerized units not only of a vinylaromatic monomer but also of a diene and forming a soft phase (component C) and, if appropriate, of a polymer of star-shaped structure which is obtained through the linkage of a plurality of block copolymer chains composed of styrene and/or α-methylstyrene and butadiene, and/or isoprene, by way of polyfunctional molecules. The thermoplastic molding compositions according to EP-A 0 767 213 can be used, for example, for plastic films as a replacement for PVC.

DE-A 44 20 952 relates to elastomeric block copolymers which have at least one block A having copolymerized units of a vinylaromatic monomer and forming a hard phase, and/or a block B having diene monomers and forming a first elastomeric (soft) phase, and at least one elastomeric block B/A having copolymerized units not only of a vinylaromatic monomer but also of a diene and forming a soft phase, where this block copolymer is normally transparent and is processable by purely thermoplastic methods. The block copolymers according to DE-A 44 20 952 have excellent suitability for the production of elastomeric moldings using the conventional methods of thermoplastics processing, for example in the form of a foil, foam, thermoformed molding, injection molding, or extruded profile.

WO 00/58380 discloses block copolymers comprising at least two hard blocks $S_1$ and $S_2$ composed of vinylaromatic monomers and at least one random soft block B/S situated between these and composed of vinylaromatic monomers and of dienes, where the proportion of the hard blocks is above 40%, based on the entire block copolymer. The block copolymers according to WO 00/58380 can be processed with further styrene polymers to give transparent polymer mixtures. The block copolymers themselves or the polymer mixtures according to WO 00/58380 can be used for the production of fibers, of foils, and of moldings, with a balanced toughness/rigidity ratio.

A disadvantage of mixtures which comprise α-methylstyrene-acrylonitrile copolymers (AMSAN) and block copolymers composed of a block forming a hard phase and composed of at least one vinylaromatic monomer and of a block forming a soft phase and composed of at least one vinylaromatic monomer and of at least one diene is that the compatibility of the AMSAN and of the block copolymer is inadequate, and by way of example, therefore, demixing of the AMSAN and of the block copolymer can occur in an extruded film or in a molding.

It is therefore an object of the present invention to provide compositions which comprise AMSAN copolymers, and also the abovementioned block copolymers, where demixing of the components mentioned is reduced or avoided.

This object is achieved via the provision of compositions comprising

A at least one copolymer A composed of
   a1) at least one alkylated styrene as component A1;
   a2) acrylonitrile as component A2;
   a3) if appropriate, at least one further monomer as component A3;

B at least one block copolymer B composed of
   b1) at least one block B1 forming a hard phase and composed of at least one vinylaromatic monomer, and
   b2) at least one block B2 forming a soft phase and composed of at least one vinylaromatic monomer and of at least one diene;

C at least one triblock copolymer C composed of
  c1) a first block C1 composed of at least one vinylaromatic monomer,
  c2) a second block C2, composed of at least one diene,
  c3) a third block C3 composed of at least one methyl methacrylate monomer or comprising at least 50% by weight of methyl methacrylate;
D if appropriate, at least one styrene polymer selected from glass-clear polystyrene and impact-resistant polystyrene.

It has been found that the triblock copolymer mentioned as component C has excellent suitability as compatibilizer between the copolymer A and the block copolymer B. Furthermore, addition of component C raises the toughness of the compositions composed of a copolymer A and of the block copolymer B. The inventive compositions feature an excellent balanced property profile, in particular high rigidity, toughness, and transparency.

In general even small amounts of component C are sufficient as compatibilizer or for raising toughness in compositions having components A and B. The inventive composition generally comprises from 0.1 to 10% by weight, preferably from 3 to 10% by weight, particularly preferably from 4 to 6% by weight, of component C, based on the entirety of components A, B, and C, and, if appropriate, D. If component D is used, the amounts used of component D are generally from 0.1 to 10% by weight, preferably from 3 to 10% by weight.

The inventive composition usually comprises an amount of from 30 to 85% by weight, preferably from 45 to 80% by weight, particularly preferably from 55 to 75% by weight, of component A, based on the entirety of components A, B, C, and, if appropriate, D.

The amount of the block copolymer B in the inventive composition is generally from 5 to 69.9% by weight, preferably from 10 to 52% by weight, particularly preferably from 19 to 41% by weight, based on the entirety of components A, B, C, and, if appropriate, D.

The present invention therefore preferably provides the inventive compositions comprising
A from 30 to 85% by weight, preferably from 45 to 80% by weight, particularly preferably from 55 to 75% by weight, of the copolymer A;
B from 5 to 69.9% by weight, preferably from 10 to 52% by weight, particularly preferably from 19 to 41% by weight, of the block copolymer B; and
C from 0.1 to 45% by weight, preferably from 3 to 34.9% by weight, particularly preferably from 4 to 17% by weight, of the copolymer C;
D from 0 to 50% by weight, preferably from 0.1 to 45% by weight, particularly preferably from 3 to 40% by weight, of component D,
where the entirety of components A, B, C, and, if appropriate, D gives 100% by weight.

In a preferred embodiment, the inventive compositions comprise
A from 55 to 75% by weight of the copolymer A;
B from 19 to 41% by weight of the block copolymer B; and
C from 4 to 6% by weight of the copolymer C,
where the entirety of components A, B, and C gives 100% by weight.

In another preferred embodiment, the inventive compositions comprise
A from 30 to 60% by weight of the copolymer A;
B from 5 to 35% by weight of the block copolymer B; and
C from 5 to 15% by weight of the copolymer C, and
D from 10 to 40% by weight of the copolymer D,
where the entirety of components A, B, C, and, if appropriate, D gives 100% by weight.

Component A
  Component A is at least one copolymer A composed of
  a1) at least one alkylated styrene as component A1;
  a2) acrylonitrile as component A2; and
  a3) if appropriate, at least one further monomer as component A3.

The copolymer A in the inventive composition is preferably composed of
  a1) from 60 to 90% by weight, preferably from 65 to 80% by weight, of at least one alkylated styrene as component A1,
  a2) from 10 to 40% by weight, preferably from 20 to 35% by weight, of acrylonitrile as component A2,
  a3) from 0 to 50% by weight, preferably from 0 to 40% by weight, of at least one further monomer as component A3,
where the entirety of components A1, A2, and A3 gives 100% by weight.

At least one alkylated styrene is used as component A1. Suitable alkylated styrenes have the general formula (I)

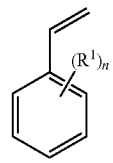

(I)

in which
R$^1$ are, independently of one another, C$_1$-C$_8$-alkyl, preferably C$_1$-C$_6$-alkyl, particularly preferably C$_1$-C$_4$-alkyl, such as methyl, ethyl, n-propyl, isopropyl, n-butyl, sec-butyl, isobutyl, tert-butyl;
n is 1, 2, or 3, preferably 1 or 2;
and the arrangement here of the radical R$^1$ if n=1 or of the radicals R$^1$ if n=2 or 3 can be in ortho-, meta-, or para-position with respect to the vinyl radical of the styrene.

Preferred suitable alkylated styrenes suitable as component A are those selected from the group consisting of α-methylstyrene (o-methylstyrene), α,p-dimethylstyrene (2,4-dimethylstyrene), α-ethylstyrene (o-ethylstyrene), α-n-propylstyrene (o-n-propylstyrene), α-isopropylstyrene (o-isopropylstyrene), p-methylstyrene, p-ethylstyrene, p-n-propylstyrene, p-isopropylstyrene, p-butylstyrene, p-tert-butylstyrene, m-methylstyrene, m-ethylstyrene, m-isopropylstyrene, m-butylstyrene, 2,5-dimethylstyrene, and 3,5-dimethylstyrene. Particular preference is given to α-methylstyrene (o-methylstyrene), and α,p-dimethylstyrene (2,4-dimethylstyrene), and very particular preference is given to α-methylstyrene (o-methylstyrene).

Examples of suitable further monomers A3 alongside the at least one alkylated styrene as component A1 and acrylonitrile as component A2 are further vinylaromatic monomers differing from component A1, e.g. styrene and styrene derivatives, methacrylonitrile, acrylic acid, methacrylic acid, dicarboxylic acids, such as maleic acid and fumaric acid, and also anhydrides thereof, such as maleic anhydride, nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide, C$_1$-C$_4$-alkyl esters of methacrylic acid, such as methyl methacrylate, ethyl methacrylate, n-propyl methacrylate, isopropyl methacrylate, n-butyl methacrylate, isobutyl methacrylate, sec-butyl methacrylate, tert-butyl methacrylate, and also hydroxyethyl acrylate, aromatic and araliphatic esters of acrylic acid and methacrylic acid, e.g. phenyl acrylate, phenyl methacrylate, benzyl acrylate, benzyl methacrylate, 2-phenylethyl acrylate, 2-phenylethyl methacrylate, 2-phenoxyethyl acrylate, and 2-phenoxyethyl methacrylate, unsaturated ethers, such as vinyl methyl ether, and also mixtures of the monomers mentioned.

In one preferred embodiment, the copolymer A is composed exclusively of α-methylstyrene as component A1 and acrylonitrile as component A2.

The copolymer A is preferably an alternating α-methylstyrene-acrylonitrile copolymer which has components A1 and A2 in the abovementioned amounts.

The molar mass (weight-average $M_w$), measured by light scattering, is generally from 50 000 to 500 000 g/mol, preferably from 60 000 to 150 000 g/mol.

In one preferred embodiment, a feature of the copolymer A is that it is transparent.

The copolymers A are known to the person skilled in the art and can be obtained by processes known to the person skilled in the art. They are usually obtained via copolymerization of the corresponding abovementioned monomers, e.g. via bulk, solution, suspension, precipitation, or emulsion polymerization. Details of these processes are described by way of example in Kunststoffhandbuch [Plastics handbook], eds. R. Vieweg and G. Daumiller, vol. V "Polystyrol" [Polystyrene], Carl-Hanser-Verlag Munich 1969, page 118 ff.

Component B

According to the invention, a block copolymer B composed of b1) at least one block B1 forming a hard phase and composed of at least one vinylaromatic monomer, and b2) at least one block B2 forming a soft phase and composed of at least one vinylaromatic monomer and of at least one diene is used as component B.

The monomer constitution of the block copolymer B is preferably from 15 to 65% by weight, preferably from 15 to 50% by weight, of diene, and from 35 to 85% by weight, preferably from 50 to 85% by weight, of vinylaromatic monomer, where the entirety of diene and vinylaromatic monomer gives 100% by weight.

The block copolymer B can take the form of a linear or star-shaped block copolymer. It is likewise possible that component B comprises two or more different block copolymers B.

It is preferable that the block copolymer B is composed of at least two blocks B1 forming a hard phase and of at least one block B2 situated between these and forming a soft phase, where the distribution of the vinylaromatic monomers and the dienes in the block B2 is preferably random. The amount of the hard phases is generally more than 30% by weight, preferably more than 40% by weight, based on the total weight of the block copolymer B. The amount of the soft phase is correspondingly less than 70% by weight, preferably less than 60% by weight, based on the total weight of the block copolymer B.

The relative proportion of 1,2-linkages of the diene units of the block B2 forming the soft phase (polydiene), based on the entirety of 1,2- and 1,4-cis/trans linkages, is preferably ≦20%, preferably from 10 to 20%, particularly preferably from 12 to 16%.

Vinylaromatic monomers that are preferably suitable and can be used in the block B1 and in the block B2 are monomers such as styrene and styrene derivatives of the formula II

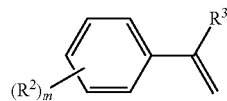

in which $R^2$ and $R^3$, independently of one another, are hydrogen or $C_1$-$C_8$-alkyl, and m is 1, 2, or 3, preferably 1 or 2, particularly preferably 1, and also mixtures of these compounds, where preference is given to styrene, α-methylstyrene, p-methylstyrene, α-ethylstyrene, p-ethylstyrene, p-tert-butylstyrene, and α-tert-butylstyrene, and very particular preference is given to styrene.

Preferably suitable dienes which can be used in the block B2 are 1,3-butadiene, isoprene, 2,3-dimethylbutadiene, 1,3-pentadiene, 1,3-hexadienes, 1-phenylbutadiene, piperylene, or a mixture of these compounds. It is preferable that 1,3-butadiene is used as diene.

The block B1 in the block copolymer B is particularly preferably composed of styrene, and the block B2 is particularly preferably composed of butadiene and styrene. The proportion of butadiene in the particularly preferred block copolymer B is from 15 to 50% by weight, based on the total weight of the block copolymer B. The proportion of styrene in the block copolymer B is correspondingly particularly preferably from 50 to 85% by weight, based on the total weight of the block copolymer B.

It is particularly preferable that the block copolymer B is composed exclusively of the blocks B1 forming the hard phase and of at least one block B2 forming the soft phase, and that it comprises no homopolydiene blocks. Preferred block copolymers B have external blocks B1 forming the hard phase and having respectively different block lengths. The weight-average molar mass of the first block $B1^1$ is preferably from 5000 to 30 000 g/mol, particularly preferably from 10 000 to 20 000 g/mol. The weight-average molar mass of the second block $B1^2$ is preferably more than 35 000 g/mol, particularly preferably from 50 000 to 150 000 g/mol. The weight-average molar mass was determined by means of GPC by taking a specimen during the polymerization reaction or by $OsO_4$ degradation followed by GPC. The methods mentioned for molar mass determination are known to the person skilled in the art.

The molar masses mentioned above and hereinafter were determined by means of gel permeation chromatography (GPC) on mixed B polystyrene gel columns from Polymer Labs, using monodisperse polystyrene standards at room temperature, and tetrahydrofuran as eluent. The absolute molar masses of the copolymers can be determined with the aid of universal calibration by means of the Kuhn-Mark-Houwink equation. The Mark-Houwink coefficients required for this, a and K, are known to the person skilled in the art for the polymer/solvent mixture to be studied and for the standard polymer/solvent mixture.

Between the external blocks $B1^1$ and $B1^2$ forming the hard phase, there can be one or more, preferably more than one, blocks B2 present, forming the soft phase. It is preferable that at least two different blocks B2, $B2^1$, and $B2^2$ are present, these having different contents of vinylaromatic monomers, and therefore having different glass transition temperatures $T_g$.

As mentioned above, the block copolymers B can have a linear or a star-shaped structure. The structure: $B1^1$-$B2^1$-$B2^2$-$B1^2$ is preferred as linear structure. The molar ratio of vinylaromatic monomer to diene in the blocks B2 is preferably smaller than 0.25 in the block $B2^1$, and preferably from 0.5 to 2 in the block $B2^2$.

Preferred star-shaped block copolymers B have a structure having at least one star-branching point of the block sequence $B1^1$-$B^2$ and having at least one star-branching point of the block sequence $B1^2$-B2, or a structure having at least one star-branching point of the block sequence $B1^1$-B2-$B1^3$ and having at least one star-branching point of the block sequence $B1^2$-B2-$B1^3$. $B1^3$ here is a further block B1 forming a hard phase and composed of vinylaromatic monomers.

Particularly preferred star-shaped block copolymers B have a structure having at least one star-branching point of the block sequence $B1^1$-$B2^1$-$B2^2$ and having at least one star-branching point of the block sequence $B1^2$-$B2^1$-$B2^2$, or having at least one star-branching point of the block sequence $B1^1$-$B2^1$-$B2^2$-$B1^3$ and having at least one star-branching point of the block sequence $B1^2$-$B2^1$-$B2^2$-$B1^3$. The molar ratio of vinylaromatic monomer to diene in the blocks B2 forming the soft phase is preferably from 0.5 to 2 in the external block $B2^1$ and preferably less than 0.5 in the internal block $B2^2$. The higher content of vinylaromatic monomer in the external block $B2^1$ makes the block copolymer tougher for the same total diene content.

Star-shaped block copolymers B having a further internal block $B1^3$ have higher rigidity combined with comparable toughness. The block $B1^3$ serves therefore as filler material in the soft phase, without changing the ratio of hard phase to soft phase. The weight-average molar mass of the block $B1^3$ is generally substantially smaller than that of the blocks $B1^1$ and $B1^2$. The weight-average molar mass (determined by means of GPC) of the block $B1^3$ is preferably from 500 to 5000 g/mol.

In one particularly preferred embodiment, a linear or star-shaped block copolymer B is used as block copolymer B and has external polystyrene blocks B1 and, between these, styrene/butadiene copolymer blocks B2 having random distribution of styrene and butadiene, and from 15 to 50% by weight, based on the total weight of the block copolymer B, of butadiene, and from 50 to 85% by weight, based on the total weight of the block copolymer B, of styrene.

The block copolymers can be prepared by any of the processes known to the person skilled in the art. One suitable process is mentioned by way of example in WO 97/40079 and in the references mentioned therein. By way of example, the block copolymers B can be prepared via sequential anionic polymerization, where at least the polymerization of the block B2 forming the soft phase takes place in the presence of a randomizer. The presence of the randomizer leads to random distribution of the diene and of the vinylaromatic units in the block B2 forming the soft phase. Suitable randomizers are donor solvents, such as ethers, e.g. tetrahydrofuran, tertiary amines, or potassium salts which are soluble (in the solvent used). If tetrahydrofuran is used, the amount of tetrahydrofuran used, in order to obtain ideal random distribution, is generally more than 0.25% by volume, based on the solvent used. At lower concentrations, blocks are obtained which have a constitution gradient (i.e. blocks whose constitution of monomer units changes relatively gradually).

If relatively large amounts of tetrahydrofuran are used, the relative proportion of 1,2-linkages of the diene units increases simultaneously, to about 30 to 35%.

On the other hand, if potassium salts are used as randomizers, the relative proportion of 1,2-linkages of the diene units in the soft phase is only insignificantly increased. The block copolymers B obtained are therefore less suitable for crosslinking and have lower glass transition temperatures $T_g$ for the same butadiene content.

The amount of the potassium salt used is generally smaller than the molar amount, based on the anionic polymerization initiator. The molar ratio of anionic polymerization initiator to potassium salt is preferably from 10:1 to 100:1, particularly preferably from 30:1 to 70:1. The potassium salt used is generally soluble in the reaction medium (solvent). Examples of suitable potassium salts are potassium alcoholates, preferably potassium alcoholates of tertiary alcohols having at least 5 carbon atoms. Particularly preferred potassium salts are potassium 2,2-dimethyl-1-propanolate, potassium 2-methylbutanolate (potassium tert-amylate), potassium 2,3-dimethyl-3-pentanolate, potassium 2-methylhexanolate, potassium 3,7-dimethyl-3-octanolate (potassium tetrahydrolinaloolate), and potassium 3-ethyl-3-pentanolate. The potassium alcoholates are obtainable by way of example via reaction of elemental potassium, potassium/sodium alloy or alkylpotassium compounds, and the corresponding alcohols, in an inert solvent.

The potassium salt is advantageously added to the reaction mixture only after addition of the anionic polymerization initiator. This method can avoid hydrolysis of the potassium salt via traces of protic contaminants. It is preferable that the potassium salt is added shortly prior to the polymerization of the random block B2 forming the soft phase.

Suitable anionic polymerization initiators I are any of the anionic polymerization initiators known to the person skilled in the art. The anionic polymerization initiators used are generally conventional mono-, bi-, and polyfunctional alkyl, aryl, or aralkyl compounds of alkali metals. It is preferable to use organolithium compounds, such as ethyl-, propyl-, isopropyl-, n-butyl-, sec-butyl-, tert-butyl-, phenyl-, diphenylhexyl-, hexamethyldi-, isoprenyl-, or polystyryllithium, or 1,4-dilithiobutane, 1,4-dilithio-2-butene, or 1,4-dilithiobenzene. Suitable amounts of the polymerization initiator depend on the desired molar mass. The amount generally used is from 0.001 to 5 mol %, based on the entirety of the monomers used.

A polymerization initiator is added at least twice during the preparation of asymmetric star-shaped block copolymers B. It is preferable that a first vinylaromatic monomer B1a and an initiator I1 are added simultaneously to the reactor and polymerized completely, and are followed, again simultaneously, by the addition of the vinylaromatic monomer B1b and by the initiator I2. This method gives two living polymer chains, B1a-I1 and B1b-I2, alongside one another, and it is onto these that the following are subsequently polymerized: the block $B2^1$ via addition of the vinylaromatic monomer together with the diene, and, if appropriate, the block $B2^2$ via further addition of vinylaromatic monomer together with diene, and also, if appropriate, the block $B1^3$ moreover via further addition of a vinylaromatic monomer B1 c. The ratio of initiator I1 to I2 determines the relative proportion of the star-branching points, present with random distribution in the resultant individual star-shaped block copolymer. In the case of the present example, the block $B1^1$ is formed via addition of the vinylaromatic monomers B1a and B1b, and the blocks $B1^2$ and $B1^3$ are formed via addition of the vinylaromatic monomers B1b and B1c alone. The molar initiator ratio I2/I1 is preferably from 4/1 to 1/1, particularly preferably from 3.5/1 to 1.5/1.

The polymerization reaction can be carried out in the presence of a solvent. Suitable solvents are the aliphatic, cycloaliphatic, or aromatic hydrocarbons which have from 4 to 12 carbon atoms and which are usually used in anionic polymerization, e.g. pentane, hexane, heptane, cyclohexane, methylcyclohexane, isooctane, benzene, alkylbenzenes, such as toluene, xylene, or ethylbenzene, or decalin, or a suitable mixture of the solvents mentioned. Cyclohexane or methylcyclohexane are preferably used.

If organylmetal compounds are used in the polymerization reaction, e.g. alkylmagnesium, -aluminum, or -zinc compounds, which have a retarding effect on polymerization rates, the polymerization reaction can also be carried out in the absence of a solvent.

After the end of the polymerization reaction, the living polymer chain can be capped by a chain terminator. Suitable chain terminators are protic compounds or Lewis acids, e.g. water, alcohols, aliphatic or aromatic carboxylic acids, and inorganic acids, such as carbonic acid or boric acid.

Instead of addition of a chain terminator after the end of the polymerization reaction, the living polymer chains can also be linked in a star-shaped manner via polyfunctional coupling agents, such as polyfunctional aldehydes, ketones, esters, anhydrides, or epoxides. This method can give symmetrical and asymmetrical star-shaped block copolymers whose branching points have the abovementioned structures, via coupling of identical or different blocks. By way of example, asymmetrical star-shaped block copolymers can be obtained via separate preparation of the individual star-branching points or via multiple initiation, e.g. double initiation using proportions of initiator in the following ratios: from 2/1 to 10/1.

Component C

Component C in the inventive compositions is at least one further terpolymer C composed of c1) a first block C1, composed of at least one vinylaromatic monomer,
c2) a second block C2, composed of at least one diene,
c3) a third block C3, composed of at least one methyl methacrylate monomer, or comprising at least 50% by weight of methyl methacrylate.

Component C

The triblock polymer C is preferably composed of:

c1) from 10 to 88% by weight, preferably from 15 to 80% by weight, particularly preferably from 15 to 55% by weight, of the first block C1,
c2) from 2 to 80% by weight, preferably from 5 to 70% by weight, particularly preferably from 10 to 45% by weight, of the second block C2,
c3) from 10 to 88% by weight, preferably from 15 to 80% by weight, particularly preferably from 35 to 75% by weight, of the third block C3, where the entirety of components C1, C2, and C3 gives 100% by weight.

In one particularly prepared embodiment, the triblock copolymer is composed of:

c1) from 35 to 55% by weight of the first block C1,
c2) from 10 to 15% by weight of the second block C2,
c3) from 35 to 50% by weight of the third block C3, where the entirety of the components C1, C2, C3 gives 100% by weight.

Suitable vinylaromatic monomers for preparation of the block C1 are the vinylaromatic monomers mentioned above in relation to component B. It is preferable to use styrene or α-methylstyrene as vinylaromatic monomer. The glass transition temperature $T_g$ of the block C1 composed of vinylaromatic monomers is generally above 23° C., preferably above 50° C.

Suitable dienes for preparation of the block C2 are the dienes mentioned above in relation to component B2. It is preferable to use butadiene or isoprene as diene. Polybutadienes suitable as block C2 are preferably those with the lowest glass transition temperature $T_g$, i.e. a $T_g$ below 0° C., preferably below −40° C. By way of example, the $T_g$ of 1,4-polybutadiene is about −90° C. and that of 1,2-polybutadiene is about 0° C. The blocks C2 can also have been hydrogenated, and the hydrogenation here takes place by processes known to the person skilled in the art.

The block C3 is composed of at least one methyl methacrylate monomer, or comprises at least 50% by weight, preferably at least 75% by weight, of methyl methacrylate. Suitable comonomers which can be used if appropriate are known to the person skilled in the art. By way of example, tert-butyl methacrylate can be used as comonomer.

Accordingly, a preferred triblock copolymer C is composed of a first block C1 composed of at least one vinylaromatic monomer selected from styrene and α-methylstyrene, and of a second block C2 composed of at least one diene selected from butadiene and isoprene, and one third block C3, composed of at least 60% by weight of PMMA.

The number-average molar mass of the triblock copolymer is generally from 10 000 g/mol to 500 000 g/mol, preferably from 40 000 g/mol to 300 000 g/mol, determined by means of GPC.

The triblock copolymer C can be prepared via anionic polymerization by processes known to the person skilled in the art. Suitable processes are disclosed by way of example in EP-A 0 524 054, EP-A 0 749 987, and EP-A 1 290 088.

Component D

Component D, which can, if appropriate, be present in addition to components A, B, and C in the inventive compositions, is at least one styrene polymer selected from glass-clear polystyrene and impact-resistant polystyrene.

Suitable glass-clear, and also impact-resistant, polystyrenes, and their preparation, structure, and properties are described by way of example in the overview references A. Echte, F. Haaf, J. Hambrecht in Angew. Chem. (int. Ed. Engl.) 20, 344-361, and in Kunststoffhandbuch [Plastics Handbook], Volume 4, Polystyrol [Polystyrene], Carl Hanser Verlag (1996). The polystyrenes are generally prepared by means of anionic or free-radical polymerization. It is preferable to use polystyrene whose toluene-soluble proportion has a weight-average molar mass $M_w$ of from 50 000 to 500 000 g/mol. Glass-clear polystyrene is particularly preferably used as component D.

Component E

The inventive compositions can comprise, in addition to components A, B, C, and, if appropriate, D, further components, e.g. further (co)polymers, as component E.

The amounts of these present in the inventive compositions—if they are present—can be from 1 to 20% by weight, preferably from 3 to 15% by weight, particularly preferably from 3 to 15% by weight, based on the entirety of the inventive compositions with components A, B, C, and, if appropriate, D, and also E.

Component E can be any of the homo- or copolymers which are suitable and are known to the person skilled in the art. It is preferable to use rubbery styrene block copolymers as component E, e.g. those selected from the group consisting of styrene-butadiene-styrene block copolymers, styrene-isoprene-styrene block copolymers, styrene-ethylene/butylene-styrene block copolymers, and styrene-ethylene/propylene-styrene block copolymers. The proportion of the styrene component in the abovementioned block copolymers is generally from 10 to 40% by weight, and the proportion of the rubber component (butadiene component, isoprene component, ethylene/butylene component, or ethylene/propylene component) is generally from 60 to 90% by weight.

Suitable block copolymers and their preparation processes are known to the person skilled in the art and are commercially available with trademark Kraton® (from Kraton Polymers LLC).

Further Components

The inventive compositions can also comprise, alongside components A, B, and C, if appropriate, D, and, if appropriate, E, additives such as lubricants and mold-release agents, pigments, dyes, flame retardants, antioxidants, stabilizers to counter the effect of light, fibrous and pulverulent fillers, fibrous and pulverulent reinforcing materials, and antistatic agents, in the amounts which are conventional for these substances and are known to the person skilled in the art.

Preparation of the Inventive Compositions

The inventive compositions are generally prepared via mixing of components A, B, C, if appropriate, D, and, if appropriate, E, and, if appropriate, of further additives. The mixing here can take place by mixing processes known to the person skilled in the art, e.g. with melting in an extruder, Banbury mixer, or kneader, or on a roll mill or calender, preferably at from 160 to 400° C., particularly preferably at from 180 to 280° C. However, the components can also be mixed "cold" without melting, the melting and homogenization of the mixture, composed of powder or of pellets, being delayed until further processing occurs.

Moldings, Foils, Fibers, and Foams

The inventive compositions can be used for the production of moldings, of foils, of fibers, or of foams. Suitable processes for the production of the moldings, foils, fibers, or foams are known to the person skilled in the art, examples being thermoforming, extrusion, injection molding, calendering, blow molding, compression molding, and sintering.

The present invention also provides moldings, foils, fibers, and foams comprising an inventive composition.

The inventive compositions are suitable by way of example as packaging for electronic components, such as integrated circuits (microchips) ("electronic packing"), for applications in chemical engineering, in household products, in bathroom items, e.g. toothbrush tumblers, cosmetics holders, etc., as housings, as tubes, as profiles, for medical items or medical devices, and in toys. The present invention therefore further provides the use of the inventive compositions as packaging for electronic components, such as integrated circuits (microchips) ("electronic packing"), for applications in chemical engineering, in household products, in bathroom items, e.g. toothbrush tumblers, cosmetics holders, etc., as housings, as tubes, as profiles, for medical items or medical devices, and in toys.

The examples below provide additional illustration of the invention.

EXAMPLES

The compositions mentioned in tables 1a and 2a are prepared via melting of the components stated in tables 1a and 2a (in the parts by weight mentioned) in a twin-screw extruder, at 230° C. The resultant polymer mixture is discharged, cooled, and pelletized.

Test Methods

The test specimens for the mechanical tests are injection molded at a measured temperature of 220° C. and a mold temperature of 45° C. Modulus of elasticity [N/mm$^2$], yield stress [N/mm$^2$], and tensile strain at break FR [%] are determined in the EN ISO 527 (DIN EN ISO 527-1 and 527-2) tensile test, using EN ISO 3167 tensile specimens, at 23° C.

Yellowness index YI [%] is determined via determination of chromaticity coordinates X, Y, and Z to DIN 5033 using D 65 standard illuminant and a 10° standard observer, and the following equation: YI=(131.48X−116.46 Z)Y.

Transmittance [%] and haze [%] are determined to ASTM D1003.

Series A

TABLE 1a

Constitutions [pts. by wt.] = parts by weight

| Example | Component A[2] [pts. by wt.] | Component B[3] [pts. by wt.] | Component C[4] [pts. by wt.] | Component C[5] [pts. by wt.] | Component D[6] [pts. by wt.] |
|---|---|---|---|---|---|
| 1A, comp[1] | 65 | 35 | | | |
| 2A, comp[1] | 65 | 30 | | | 5 |
| 3A, comp[1] | 65 | 25 | | | 10 |
| 4A, comp[1] | 60 | 40 | | | |
| 5A, comp[1] | 60 | 30 | | | 10 |
| 6A | 70 | 25 | 5 | | |
| 7A | 65 | 30 | 5 | | |
| 8A | 70 | 25 | | 5 | |
| 9A | 65 | 30 | | 5 | |

[1]Comparative example
[2]Luran ® KR2556 (BASF SE)
[3]Styrolux ® 3G55 (BASF SE)
[4]SBM A012 (Arkema)
[5]SBM A250 (Arkema)
[6]PS 158K (BASF SE)

TABLE 1b

Mechanical and optical data for extruded foils

| | perpendicular | | | parallel | | | optical properties | | |
|---|---|---|---|---|---|---|---|---|---|
| Example | Modulus of elasticity [N/mm$^2$] | Yield stress [N/mm$^2$] | Tensile strain at break [%] | Modulus of elasticity [N/mm$^2$] | Yield stress [N/mm$^2$] | Tensile strain at break [%] | Transmittance [%] | Haze [%] | YI [%] |
| 1A, comp[1] | 1519 | | 1.5 | 2529 | 53.2 | 11.7 | 81.5 | 62.2 | 2.7 |
| 2A, comp[1] | 1492 | | 5.8 | 2681 | 56.2 | 17.4 | 81.5 | 57.7 | 2.2 |
| 3A, comp[1] | 1676 | | 5.8 | 2680 | 56.4 | 14 | 81.3 | 66.6 | 4.3 |
| 4A, comp[1] | 1102 | | 6.4 | 2002 | 44.9 | 20.3 | 82 | 53.2 | 1.3 |
| 5A, comp[1] | 1484 | | 4.9 | 2426 | 50.3 | 13.2 | 81.5 | 62.3 | 4.4 |
| 6A | 2023 | 43.3 | 24.2 | 2454 | 54.4 | 12.6 | 79.3 | 22.8 | 8.7 |
| 7A | 1796 | | 7 | 2132 | 46 | 25.5 | 71.6 | 52.7 | 11.2 |
| 8A | 2026 | 36.9 | 5.7 | 2638 | 59 | 12.8 | 84.4 | 14.3 | 3.5 |
| 9A | 1716 | | 21.1 | 2416 | 54.3 | 16.5 | 82.9 | 20.3 | 3.6 |

[1] Comparative example

Series B

TABLE 2a

Constitutions [pts. by wt.] = parts by weight

| Example | D[1] [pts. by wt.] | A[2] [pts. by wt.] | A[3] [pts. by wt.] | C[4] [pts. by wt.] | C[5] [pts. by wt.] | C[6] [pts. by wt.] | E[7] [pts. by wt.] | B[8] [pts. by wt.] | B[9] [pts. by wt.] |
|---|---|---|---|---|---|---|---|---|---|
| 1Bcomp[10] | 35 | 35 | | 30 | | | | | |
| 2Bcomp[10] | 35 | 35 | | 25 | | | 5 | | |
| 3Bcomp[10] | 35 | 35 | | 20 | | | 10 | | |
| 4B | 35 | 35 | | 20 | | | | 10 | |
| 5B | 35 | 35 | | 20 | | | | | 10 |
| 6B | 35 | 35 | | 10 | | | | | 20 |
| 7Bcomp[10] | 35 | 35 | | | 20 | | 10 | | |
| 8Bcomp[10] | 35 | 35 | | | | 20 | 10 | | |
| 9Bcomp[10] | 35 | | 35 | 25 | | | 5 | | |

[1] Component CB: PS 158K (BASF)
[2] Component A: Luran ® 358 N (BASF)
[3] Component A: Luran ® 378 P (BASF)
[4] Component C: SBM A123 (Arkema)
[5] Component C: SBM A012 (Arkema)
[6] Component C: SBM A250 (Arkema)
[7] Component E: Kraton ® G1652 (Kraton Polymers LLC)
[8] Component B: Styroflex ® 2G 66 (BASF AG)
[9] Component B: Styrolux ® BX 6401 (BASF AG)
[10] Comparative example TABLE 2b Mechanical and optical data for extruded foils (honeycomb design)

| | parallel | | | perpendicular | | |
|---|---|---|---|---|---|---|
| Example | Modulus of elasticity [N/mm$^2$] | Yield stress [N/mm$^2$] | Tensile strain at break [%] | Modulus of elasticity [N/mm$^2$] | Yield stress [N/mm$^2$] | Tensile strain at break [%] |
| 1Bcomp[1] | 1231 | 25.7 | 21.8 | 1032 | 17.3 | 12.3 |
| 2Bcomp[1] | 1395 | 26 | 37.8 | 1117 | 16.2 | 16.5 |
| 3Bcomp[1] | 1460 | 26.7 | 31.3 | 1079 | 15.2 | 24.9 |
| 4B | 1625 | 30.5 | 37.3 | 1106 | 16.9 | 21.2 |
| 5B | 1767 | 34.2 | 25.7 | 1353 | 18.9 | 12.9 |
| 6B | 2257 | 42.2 | 18.6 | 1518 | 20.1 | 5.8 |
| 7Bcomp[1] | 1230 | 23.5 | 9.8 | 953 | 15.6 | 6.1 |

TABLE 2b-continued

Mechanical and optical data for extruded foils (honeycomb design)

| | parallel | | | perpendicular | | |
|---|---|---|---|---|---|---|
| Example | Modulus of elasticity [N/mm$^2$] | Yield stress [N/mm$^2$] | Tensile strain at break [%] | Modulus of elasticity [N/mm$^2$] | Yield stress [N/mm$^2$] | Tensile strain at break [%] |
| 8Bcomp[1)] | 2644 | | 2.4 | 2462 | | 2.5 |
| 9Bcomp[1)] | 1648 | 30 | 18.2 | 1357 | 16.8 | 11.7 |

[1)]Comparative example

The invention claimed is:

1. A composition comprising:
   A at least one copolymer A composed of
   a1) at least one alkylated styrene as component A1;
   a2) acrylonitrile as component A2; and
   a3) optionally, at least one further monomer as component A3;
   B at least one block copolymer B composed of
   b1) at least one block B1 forming a hard phase and composed of at least 15 one vinylaromatic monomer, and
   b2) at least one block B2 forming a soft phase and composed of at least one vinylaromatic monomer and of at least one diene;
   C at least one triblock copolymer C composed of
   c1) a first block C1 composed of at least one vinylaromatic monomer,
   c2) a second block C2, composed of at least one diene, and
   c3) a third block C3 composed of at least one methyl methacrylate monomer or comprising at least 50% by weight of methyl methacrylate; and
   D optionally, at least one styrene polymer selected from glass-clear polystyrene and impact-resistant polystyrene.

2. The composition according to claim 1 comprising:
   A from 30 to 85% by weight of the copolymer A;
   B from 5 to 69.9% by weight of the block copolymer B; and
   C from 0.1 to 45% by weight of the copolymer C;
   D from 0 to 50% by weight of component D,
   where the entirety of components A, B, C, and, optionally, D gives 100% by weight.

3. The composition according to claim 1, wherein the copolymer A comprises:
   a1) from 60 to 90% by weight of at least one alkylated styrene as component A1,
   a2) from 10 to 40% by weight of acrylonitrile as component A2,
   a3) from 0 to 30% by weight of at least one further monomer as component A3, where the entirety of components A1, A2, and A3 gives 100% by weight.

4. The composition according to claim 1, wherein the monomer constitution of the block copolymer B is from 15 to 65% by weight of diene, and from 35 to 85% by weight of vinylaromatic monomer, where the entirety of diene and vinylaromatic monomer gives 100% by weight.

5. The composition according to claim 1, wherein the block copolymer B is composed of at least two blocks B1 forming a hard phase and of at least one block B2 situated between these and forming a soft phase.

6. The composition according to claim 1, wherein, in the block copolymer B, the relative proportion of 1,2-linkages of the diene units of the block B2 (polydiene) forming the soft phase, based on the entirety of 1,2- and 1,4-cis/trans linkages, is $\leq 20\%$.

7. The composition according to claim 1, wherein, in the block copolymer B, the block B1 is composed of styrene and the block B2 is composed of butadiene and styrene.

8. The composition according to claim 1, wherein the triblock copolymer C is composed of
   c1) from 10 to 88% by weight of the first block C1,
   c2) from 2 to 80% by weight of the second block C2, and
   c3) from 10 to 88% by weight of the third block C3,
   where the entirety of components C1, C2, and C3 gives 100% by weight.

9. The composition according to claim 1, wherein the triblock copolymer C is composed of a first block C1 composed of at least one vinylaromatic monomer selected from styrene and α-methylstyrene, of a second block C2 composed of at least one diene selected from butadiene and isoprene, and of a third block C3 composed of at least 60% by weight of PMMA.

10. The composition according to claim 1, wherein component D is glass-clear polystyrene.

11. The composition according to claim 1, wherein rubbery styrene block copolymers are comprised as additional component E.

12. A process for the preparation of compositions according to claim 1, which comprises mixing components A, B, C, optionally D, and, optionally, E, and, optionally further additives.

13. A molding, a foil, a fiber, or a foam comprising a composition according to any of claim 1.

14. Packaging for electronic components, packaging for applications in chemical engineering, household products, bathroom items, housings, tubes, profiles, medical items or medical devices, and toys comprising the composition according to claim 1.

* * * * *